United States Patent [19]

Sweat

[11] Patent Number: 4,755,303

[45] Date of Patent: * Jul. 5, 1988

[54] METHOD OF CONVERTING BRINES TO USEFUL PRODUCTS

[75] Inventor: Samuel F. Sweat, Plant City, Fla.

[73] Assignee: Brine Extraction Systems Technology Company, Columbus, Ohio

[*] Notice: The portion of the term of this patent subsequent to Jan. 6, 2004 has been disclaimed.

[21] Appl. No.: 9,159

[22] Filed: Jan. 30, 1987

[51] Int. Cl.$^4$ .............................................. C02F 1/52
[52] U.S. Cl. .................... 210/722; 210/724; 210/726; 210/737; 210/912; 423/184
[58] Field of Search ............... 210/710, 712, 713, 722, 210/724, 726, 737, 759, 912; 423/158, 164, 308, 140, 184

[56] References Cited

U.S. PATENT DOCUMENTS

| 3,262,865 | 7/1966 | Waters | 210/724 |
| 4,016,075 | 4/1977 | Wilkins | 210/712 |
| 4,405,463 | 9/1983 | Jost et al. | 210/722 |
| 4,465,598 | 8/1984 | Dorlington et al. | 210/912 X |
| 4,634,533 | 1/1987 | Somerville et al. | 210/912 X |

FOREIGN PATENT DOCUMENTS 732211  5/1980  U.S.S.R. ............................. 210/722

Primary Examiner—Tom Wyse
Attorney, Agent, or Firm—John L. Gray

[57] ABSTRACT

A method for recovering useful animal feed supplements and a purefied brine from saline waters, such as oil and gas field brine wastes, involving the steps of adding an oxidizing agent to the brine to convert the divalent ferrous ions in the brine to ferric ions, then adding phosphoric acid in an amount approaching the stoicheometric equivalent of the divalent calcium ion the brine, then raising the pH of the brine to between 9 and 10 utilizing a material selected from the group consisting of sodium hydroxide or a mixture of sodium hydroxide and sodium carbonate followed by filtration to extract the feed supplement and thereafter adding a sufficient amount of hydrochloric acid to bring the pH to 7 and then crystallizing the sodium chloride from the resultant purefied brine solution.

9 Claims, 1 Drawing Sheet

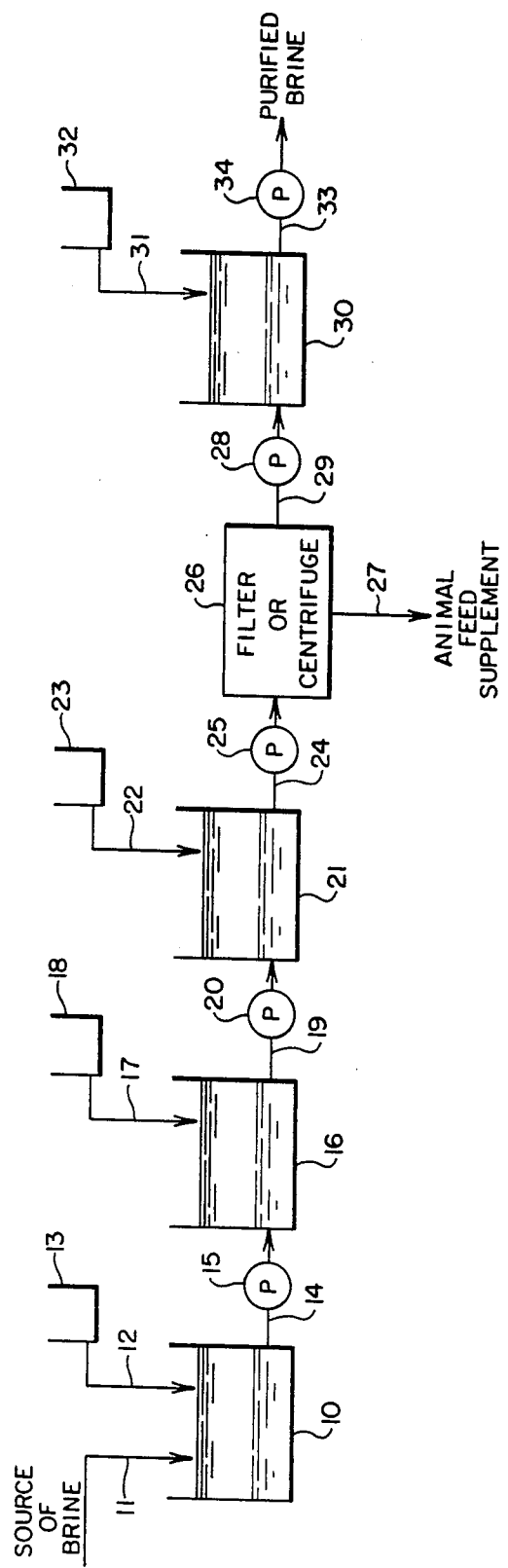

METHOD OF CONVERTING BRINES TO USEFUL PRODUCTS

BACKGROUND OF THE INVENTION

This invention is concerned with a process of recovering useful animal feed supplements with some trace elements from saline waters such as oil and gas field brine wastes, seawater or effluent from a seawater desalination plant or other inland saline waters. It also involves the production of a purified brine and complementary thereto results in the disposal of a waste stream with a method that is environmentally safe. Oil and gas field brines result from oil and gas field operations in the production and handling of crude oil and natural gas. The quantities of brines thus produced can be substantial. Various methods of disposal of these brines have been attempted and a discussion of these various methods is set forth in copending U.S. patent application Ser. No. 727,804, now U.S. Pat. No. 4,634,533, of which applicant is a coinventor.

The process disclosed in U.S. patent application Ser. No. 727,804 is one method of producing useful products from brine; however, it involves a significant capital investment in equipment and the consequent high cost of operation.

SUMMARY OF THE INVENTION

The present invention results in the production of a high-quality animal feed supplement from brine, as well as a purified brine. The present invention utilizes a minimum amount of equipment to produce a useful animal feed supplement and, if desired, a purified brine. It involves the steps of adding an oxidizing agent to the brine to convert the divalent ferrous ions in the brine to ferric ions, then adding phosphoric acid in an amount of from 70 to 100 percent of the substantially stoicheometric equivalent of phosphoric acid to the divalent calcium in the brine, then raising the pH of the brine to between 8 and 10 utilizing a material selected from the group consisting of sodium hydroxide or a mixture of sodium hydroxide and sodium carbonate followed by filtration to extract the animal feed supplement. Thereafter sufficient HCL can be added to the brine to bring the pH to 7 producing a purified brine from which a relatively pure sodium chloride can be recovered.

If this is operated at a batch process, it only requires one tank and one pump. If it is operated as a continuous process, only four tanks are required with accompanying pumping and piping equipment for the entire process.

It is, therefore, an object of this invention to provide a process for the recovery of useful products for use as an animal feed supplement, as well as purified brine, from oil and gas field brine wastes, as well as other saline waters.

This, together with other objects and advantages of the invention, will become apparent in the details of construction and operation as more fully described hereinafter and claimed, reference being had to the accompanying drawing forming a part hereof wherein like numerals refer to like parts throughout.

BRIEF DESCRIPTION OF THE DRAWING

The single drawing FIGURE illustrates, in the form of a schematic diagram, the process of the present invention.

DETAILED DESCRIPTION OF THE INVENTION

Referring to the FIGURE, a source of brine is introduced into tank 10 through conduit 11. If the brine in question contains significant amounts of oil, as would be the case if the brine is oil or gas field waste, it may be necessary to remove traces of oil which are present in the brine. Typically, there is approximately one-half pint of oil per barrel of brine when received from oil field operations. This oil removal may be accomplished through the use of a surface skimmer which collects oil floating on the surface of the brine and may also be removed from the brine in a separation device such as a heater treater, which typically comprises a holding tank or the like which provides undisturbed residence time for separation of the oil from the brine. Heat is supplied to accelerate the separation process. This procedure is thoroughly disclosed in U.S. patent application Ser. No. 727,804, and is not considered a part of this invention. The thus treated brine may then be filtered to remove suspended solids and the brine is then introduced through conduit 11 into tank 10. Ferrous ion in the brine in tank 10 is then oxidized with sodium peroxide ($Na_2O_2$) or hydrogen peroxide ($H_2O_2$). However, air sparging may also be used. Preferably this is done at a temperature of between 90° and 100° C. The oxidizer may be added through conduit 12 from source tank 13.

The thus treated brine is conveyed through pipe 14 by means of pump 15 to tank 16 where phosphoric acid (preferably deflorinated) is added through conduit 17 from source tank 18 at a rate slightly less than that necessary to react with the divalent calcium ions, preferably in an amount to achieve 70 to 100 percent of the stoicheometric ratio of the phosphoric acid to the divalent calcium ions in the brine. The resultant brine is pumped through pipe 19 by means of pump 20 to tank 21. In tank 21 either sodium hydroxide or a mixture of sodium hydroxide and sodium carbonate are added to the brine by means of conduit 22 from source tank 23. The pH is slowly raised to a pH of between 8 and 10, preferably to a pH of between 8.5 and 9. If a mixture of sodium hydroxide and sodium carbonate is used, the pH must be stopped at a pH of about pH 5 to preclude the formation of $CO_3$ compounds and then the final pH adjustment must be made with sodium hydroxide to achieve a pH of between 8 and 10.

The resultant treated brine is removed through pipe 24 using pump 25 and the resultant product is either filtered or centrifuged at 26 and the solids are removed at 27. The solids may be dried, as is, or washed and then dried. If it is desired to recover a purified brine, the remaining liquid is removed through pipe 29 using pump 28 into tank 30 where sufficient hydrochloric acid is introduced through conduit 31 from source tank 32 so as to bring the pH of the brine to a pH of 7. The resultant purefied brine is removed through pipe 33 by use of pump 34.

The chemical reactions involved in producing the animal feed supplement are set forth below:

1. 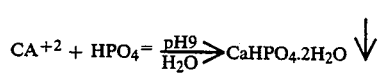

2. 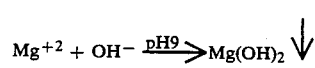

3.

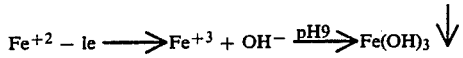

The operation of this process is shown in the following example.

EXAMPLE

Using a starting brine having the following composition 0.016% Fe, 0.061% $SO_4^{--}$, 5.62% Na, 0.52% Mg, and 3.80% Ca, and a specific gravity of 1.208 grams per cc, the feed supplement that was produced had the following composition.

|  | Ca % | Mg % | Na % | Cl % | Fe % | K % |
|---|---|---|---|---|---|---|
| Solids | 22.1 | 3.0 | .1 | .1 | .09 | .001 |
| Liquid | .003 | .001 | — | — | N.D. | .086 |

|  | P % | Free H₂O % | $SO_4^=$ |
|---|---|---|---|
| Solids | 17.1 | <1 | 0.35 |
| Liquid | N.D. | — | <0.01 |

The brine used contained approximately 15 percent solids.

After the solids were removed, the pH of the liquid was lowered to 7 with dilute hydrochloric acid. The liquid was boiled to reduce the volume by 25 percent. Upon cooling, sodium chloride crystallized out of the solution.

An analysis of the sodium chloride showed less than 0.01% calcium and less than 0.01% magnesium. The iron and phosphorus were not detectable.

The reagents used, namely NaOH, H₃PO₄, and HCL were all CP grade. The resultant dried product is a premium horse and cattle feed supplement and it also has use in the poultry industry. The sodium chloride produced is unusually pure and, unexpectedly, even the $SO_4^{--}$ has been transferred to the solids.

While this invention has been described in its preferred embodiment, it is appreciated that variations thereon may be made without departing from the proper scope and spirit of the invention.

What is claimed is:

1. A method for recovering useful products from a brine containing divalent ferrous, calcium, and magnesium ions comprising the steps of:
    (a) adding a sufficient amount of an oxidizing agent to said brine to convert said ferrous ions to ferric ions;
    (b) immediately thereafter adding phosphoric acid in an amount to achieve 70 percent to 100 percent of a stoichiometric ratio of phosphoric acid to the divalent calcium ions in said brine;
    (c) immediately thereafter adding a sufficient amount of a material selected from the group consisting of sodium hydroxide and a mixture of sodium hydroxide and sodium carbonate to said brine to raise the pH of said brine to a pH of between 8 and 10; and
    (d) immediately thereafter separating said calcium phosphate, magnesium hydroxide, and iron oxide from said brine.

2. The method of claim 1 wherein immediately following the separation step of (d), sufficient hydrochloric acid is added to the brine to reduce the pH of the brine to a pH of approximately 7.

3. The method of claim 2 wherein said brine having a pH of approximately 7 is concentrated to a point that the dissolved sodium chloride will crystallize and thereafter the crystallized sodium chloride is separated from the solution.

4. The method of claim 1 wherein the oxidizing agent is taken from the group consisting of sodium peroxide (Na₂O₂) and hydrogen peroxide (H₂O₂).

5. The method of claim 4 wherein heat is supplied to said brine immediately following step (a) and before step (b).

6. The method of claim 1 wherein heat is supplied to said brine immediately following step (a) and before step (b).

7. The method of claim 1 wherein the separation of step (d) is accomplished by filtration.

8. The method of claim 1 wherein the separation of step (d) is accomplished by centrifugation.

9. The method of claim 1 wherein in step (c) a sufficient amount of a material selected from the group consisting of sodium hydroxide and a mixture of sodium hydroxide and sodium carbonate is added to said brine to raise the pH of said brine to a pH of between 8.5 and 9.

* * * * *